United States Patent [19]
Lumbis et al.

[11] Patent Number: 5,673,876
[45] Date of Patent: Oct. 7, 1997

[54] AUTOMATIC ELECTRIC TRAINLINE SAFETY INTERLOCK

[75] Inventors: Anthony W. Lumbis; Bryan M. McLaughlin, both of Watertown; Dale R. Stevens, Adams Center, all of N.Y.; Arnold W. Knight, New Brighton, Minn.

[73] Assignee: New York Air Brake Corporation, Watertown, N.Y.

[21] Appl. No.: 621,886

[22] Filed: Mar. 26, 1996

[51] Int. Cl.$^6$ ..................................... B61K 13/00
[52] U.S. Cl. .................. 246/169 R; 246/167 R; 246/182 B; 246/196; 307/19.1; 191/11
[58] Field of Search ............. 246/167 R, 182 R, 246/182 B, 182 C, 196, 169 R; 213/1.3, 1.6; 307/9.1, 10.1, 36; 191/11

[56] References Cited

U.S. PATENT DOCUMENTS

| | | | |
|---|---|---|---|
| 1,856,455 | 5/1932 | Banks et al. | 213/1.3 |
| 3,696,758 | 10/1972 | Godinez | 307/9.1 |
| 3,868,909 | 3/1975 | Pelabon | 307/9.1 |
| 4,835,693 | 5/1989 | Smith et al. | 246/182 B |
| 4,892,204 | 1/1990 | Lumbis | 213/1.6 |
| 5,315,520 | 5/1994 | Drake et al. | 246/182 B |
| 5,412,572 | 5/1995 | Root et al. | 246/182 B |

*Primary Examiner*—Mark T. Le
*Attorney, Agent, or Firm*—Barnes & Thornburg

[57] ABSTRACT

A method and apparatus for preventing energization or powering of an electric trainline until a test signal transmitted through the train is verified by the locomotive.

19 Claims, 4 Drawing Sheets

AUTOMATIC ELECTRIC TRAINLINE SAFETY INTERLOCK

BACKGROUND AND SUMMARY OF THE INVENTION

The present invention relates generally to electrified trains and more specifically to a method for safely energizing the power line of the train.

Electro-pneumatic train braking requires electrical current to be transmitted over wires, serially connected between each car over the entire length of the train or consist from the locomotive. There is a need for insuring that the power is not applied when the connections between each car are initially made. The reason for the concern is that a typical electro-pneumatic (EP) brake system requires from 1000 watts to 1500 watts of power operating at voltages in the range of 160 TO 240 volts AC or DC. Since the connections between the cars have to be made manually, a potential hazard exists if the connections are made with the system or trainlines energized. To avoid this hazard, the system is shut down, the cars are connected and then the system is brought up manually. The hazard would still exist if the system was not turned off during interchange or if it was prematurely brought up.

The problem exists on trains wherein each car includes electro-pneumatic operated brake equipment, or on the electro-pneumatic portion of a mixed train containing both conventional pneumatic and electro-pneumatic brake equipment.

Thus, an object of the present invention is to provide an electrical power system which prevents the electrocution hazards during interchange.

Another object of the present invention is to provide a system which automatically de-energizes during interchange and re-energizes after interchange.

These and other objects are achieved by a method and apparatus which determines that all of the cars are connected and then subsequently automatically powers the train thereafter at a first voltage.

The specific method includes de-energizing the power line at the locomotive. Next, an electrical signal is transmitted through each of the cars in the train between the locomotive and the last car in the consist at a second voltage substantially less than the first voltage. Upon verification of receipt of the test signal, the trainline is powered automatically. Preferably, the powering of the train is delayed a predetermined time period after verification. An end of train device or similar device is included in the last car and generates the test signal which is transmitted over the trainline wires to the locomotive. The end of train device includes a low voltage source substantially less than the first voltage capable of operating either a beacon or transponder on the last car. The locomotive engineer determines when the cars are in interchange and can manually de-energize the system. Opening the trainline will also de-energize the line and switch the cars to battery operation.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
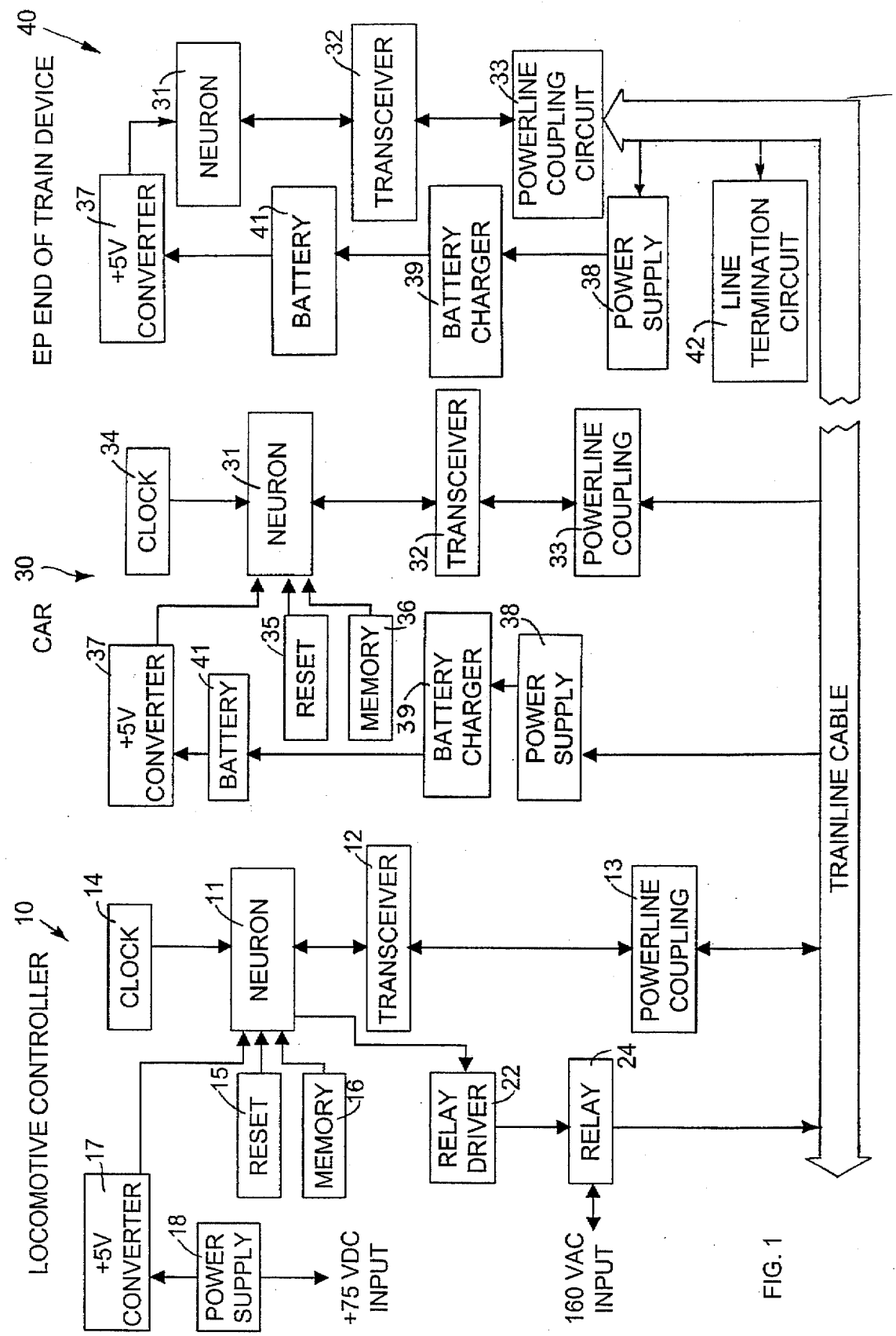
FIG. 1 is a schematic of a train having electro-pneumatic braking and incorporating the principles of the present invention.

A train consist, as illustrated in FIG. 1, includes a locomotive 10, a plurality of cars 30 and an end of train device 40, located on the last car, connected by trainline 50. The trainline, preferably is a pair of power lines, but may include other signal lines. The system described provides communications over the power lines but the power and communication lines may be separate lines within the trainline 50. The locomotive 10 communicates and controls the braking and monitors the health of the individual cars using a master brake controller or communications chip 11 which is a Neuron chip as part of a LonWorks communication system, designed by Echelon Corporation of Palo Alto, Calif. The Neuron chip 11 can communicate via transceiver 12 connected to the trainline via power line coupling circuit 13. The power line coupling circuit 13, for example, can be a transformer and capacitor circuit, to provide AC or DC isolation, the processor consists of a Neuron chip 11, clock 14, reset 15, and memory 16. The Neuron chip 11 is powered by a voltage converter 17 which is connected to a power supply 18. As illustrated, the 75 volt DC input available on the locomotive is conditioned by power supply 18 and provides a 24 volt DC supply to the converter 17. The DC to DC Converter 17 provides 5 volt DC output from the 24 volt DC input. The Neuron chip 11 controls powering or energizing of the power lines on the trainline 50 by a relay driver 22 and a relay 24. The high voltage AC or DC power source on the trainline is connected as an input to the relay 24 and provided on the trainline cable 50 under the control of the relay 24. Typically, the available power source is 160 to 230 volts AC or DC.

Each of the individual cars 30 includes a local brake controller or Neuron chip 31, communicating over the trainline 50 via power line carrier transceiver 32 and power line coupling circuit 33. Other components of the controller include the Neuron chip 31, a clock 34, a reset circuit 35, and memory 36. A power supply 38 connected to the trainline 50 receives power from the trainline and charges the battery 41 through the battery charger 39. The battery 41 provides power as an input to the converter 37 which powers the Neuron chip 31.

The end of train device 40 on the last car of the consist includes a Neuron chip 31 connected to the trainline 50 by transceiver 32 and coupling circuit 33. It also includes power supply 38, battery charger 39, battery 41 and converter 37. The end of train device 4 also includes a line termination circuit 42.

It should be noted that the Neuron chip 11 and the LonWorks is a preferred communication method. Other communication methods may be used. The communication, control and monitoring system at the locomotive and at the individual cars may include additional elements or pieces of electronics, but those disclosed are those needed to perform the method of the present invention. For example, the Neuron chip 31 may receive input signals monitoring the air pressure and various elements of the electro-pneumatic brake system, hot box detector or other kinds of devices monitoring the conditions or parameters on each of the individual cars.

Although each of the cars 30 and 40 include a battery 41, the system operates from a 120–240 volts AC or DC with a power level of 1000 to 1500 watts over the trainline 50. The trainline 50 is a serially connected trainline running car to car through an appropriate connector. The present method prevents powering of the trainline 50 until all of the cars are connected in the trainline up to and including the last car and end of train device 40 located on the last electrically connected car. This removes the potential hazard that exists if the trainline 50 is powered at 160 to 230 volts (1000–1500 watts) during the train make-up or car interchange. The battery 41 on each car has sufficient power to operate the Neuron chip 31 and its transceiver 32.

It is possible to have a train with both electro-pneumatic and conventional pneumatic brakes operating in the same train. However, in order for the electro-pneumatic brakes to be operational, the cars equipped with the electro-pneumatic brakes must be the first group of cars following the locomotive. Additionally, for the safety interlock to function, the last car equipped with electro-pneumatic brakes must have an end of train device 40 connected to its trainline connector.

The present system prevents powering of the trainline 50 until it can be determined that all of the cars are serially interconnected. To determine the successful interconnection of all of the cars to each other and to the locomotive 10, the end of train device 40 under control of its Neuron chip 31 transmits a signal over the unpowered power lines 50 to the locomotive controller 10. Once the Neuron chip 11 in the locomotive 10 determines that the Neuron chip 31 in the end of the train device 40 on the last car of the consist has transmitted a test signal through the serially connected trainline 50, the Neuron chip 11 will activate the relay driver 22 and relay 24 to connect the high voltage power source to the trainline 50. This in turn powers all car control devices on each car equipped with electro-pneumatic brakes. The signal may be a spread spectrum frequency signal having a frequency, for example, in the 100 kHertz to 450 kHertz range and a signal level of approximately 5 volts. As an alternative, the test signal may be transmitted through the train from the locomotive 10 to the end of train device 40 which reports receipt of the test signal either back through the train over trainline 50 or via other communication links.

Figure 2:
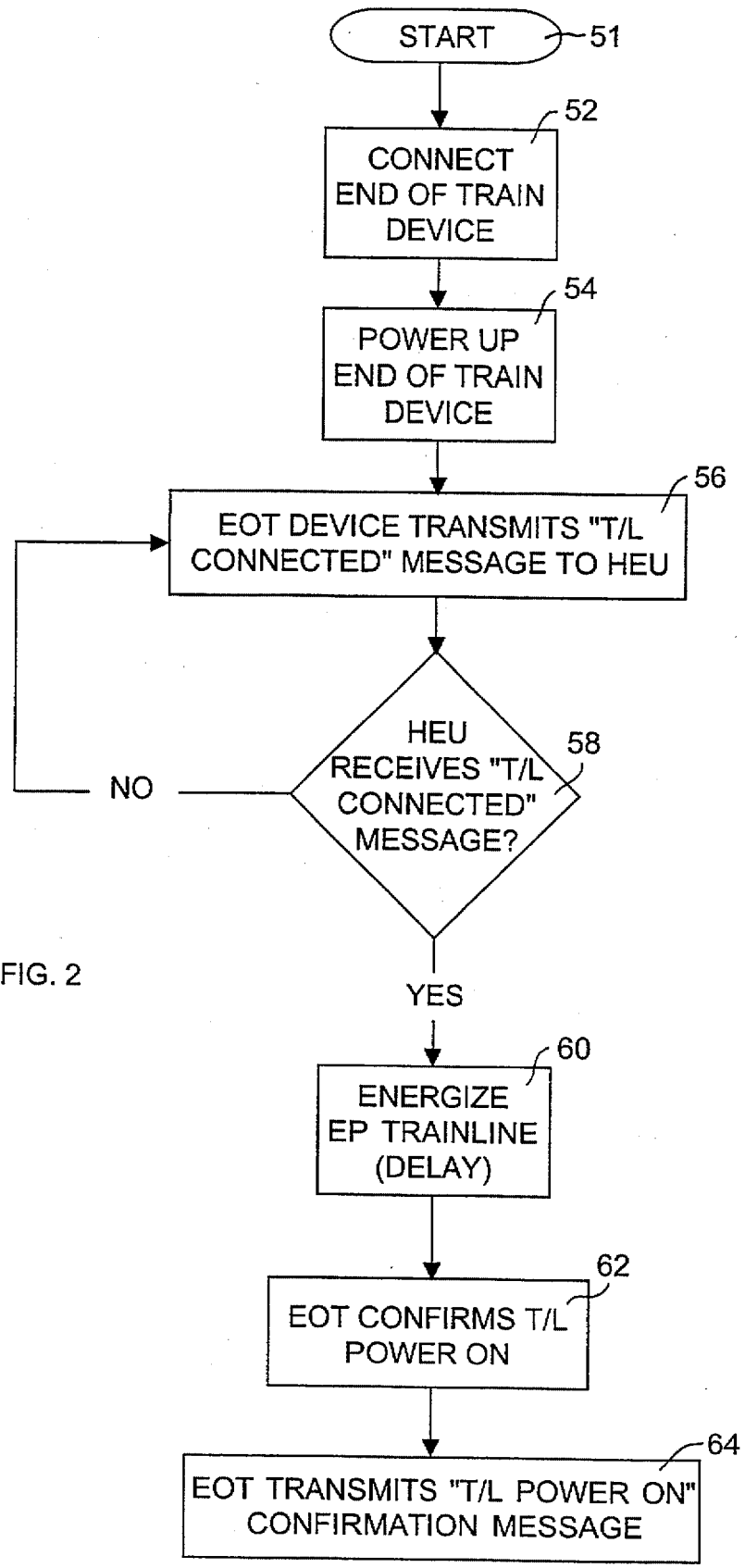
FIG. 2 is a flow chart of the method of energizing the electro-pneumatic trainline.

The flow chart of the operation is illustrated in FIG. 2. It begins at 51 with the initiation of the power up on the locomotive brake controller 10 and with the trainline power disabled. The end of train device 40 is connected to the trainline connector on the last car, at box 2, and powered up, at box 54. This initiates sending, at box 56, a repetitive trainline continuity message by the end of the train device 40 to the locomotive brake controller 10. Once a receipt of a valid signal from the end of train device 40 on the last car is received by the Neuron chip 11 at the locomotive, at box 58, Neuron chip 11 energizes the trainline using relay driver 22 and relay 24 as indicated by box 60. After the trainline 50 is energized, the end of train device 40 confirms that the trainline 50 as indicated at box 62, is powered up and send a confirmation message to the locomotive brake controller, as indicated by box 64. Preferably, there is a delay between receipt of trainline connected, message received, box 58, and energizing trainline 50, box 60, for safety.

The routine on FIG. 2 may be performed in combination with serialization of the train. As an alternate method, the locomotive controller 10 can send a "polling" message to the end of train device requesting a continuity message response from the end of train device 40. When a response is received from the end of train device 40, the power relay 24 is switched on, energizing the trainline 50.

Figure 3:
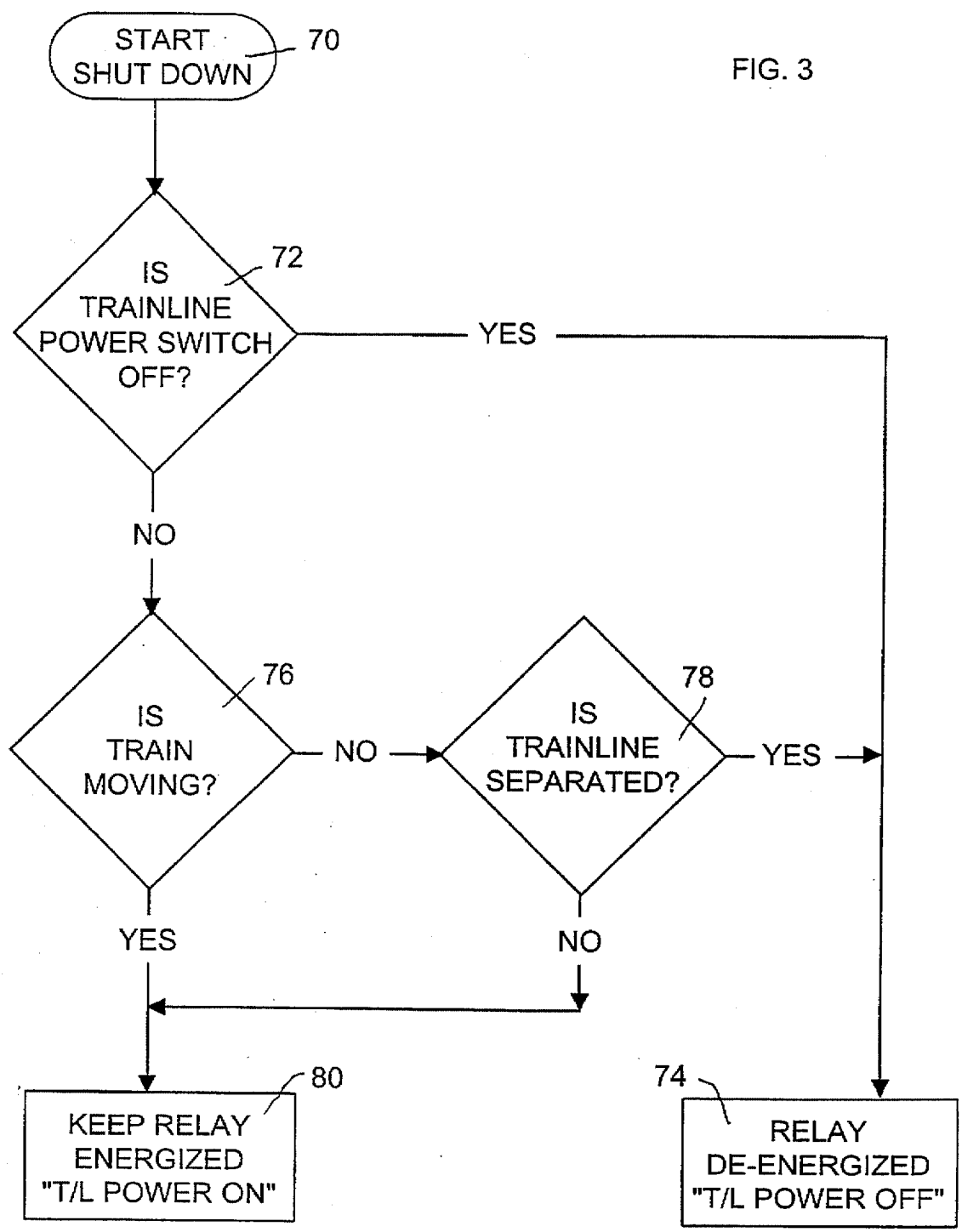
FIG. 3 is a flow chart of a method of automatically de-energizing the electro-pneumatic trainline according to the principles of the present invention.

A flow chart of the operation of the Neuron chip 11 to de-energize the power on trainline cables 50 is illustrated in FIG. 3. The process begins after the shutdown is indicated by box 70. A determination is then made at box 72 as whether the train power switch is off. If it is off, then the relay 24 at the locomotive controller 10 is de-energized, therefore keeping the trainline 50 off. If the trainline power switch is on, then there is a determination, at box 76, as to whether the train is moving. If a train is not moving, then at box 78, it is determined whether the trainline is separated. If it is separated, then again, relay 24 is de-energized, at box 74. If the trainline power switch is on, the train is not moving, and the trainline is not separated, then the relay 24 is energized to power up the trainline 50. Also, if the trainline power switch is on and the train is moving, then the relay 24 is energized, at box 80, and the train line is powered.

Figure 4:
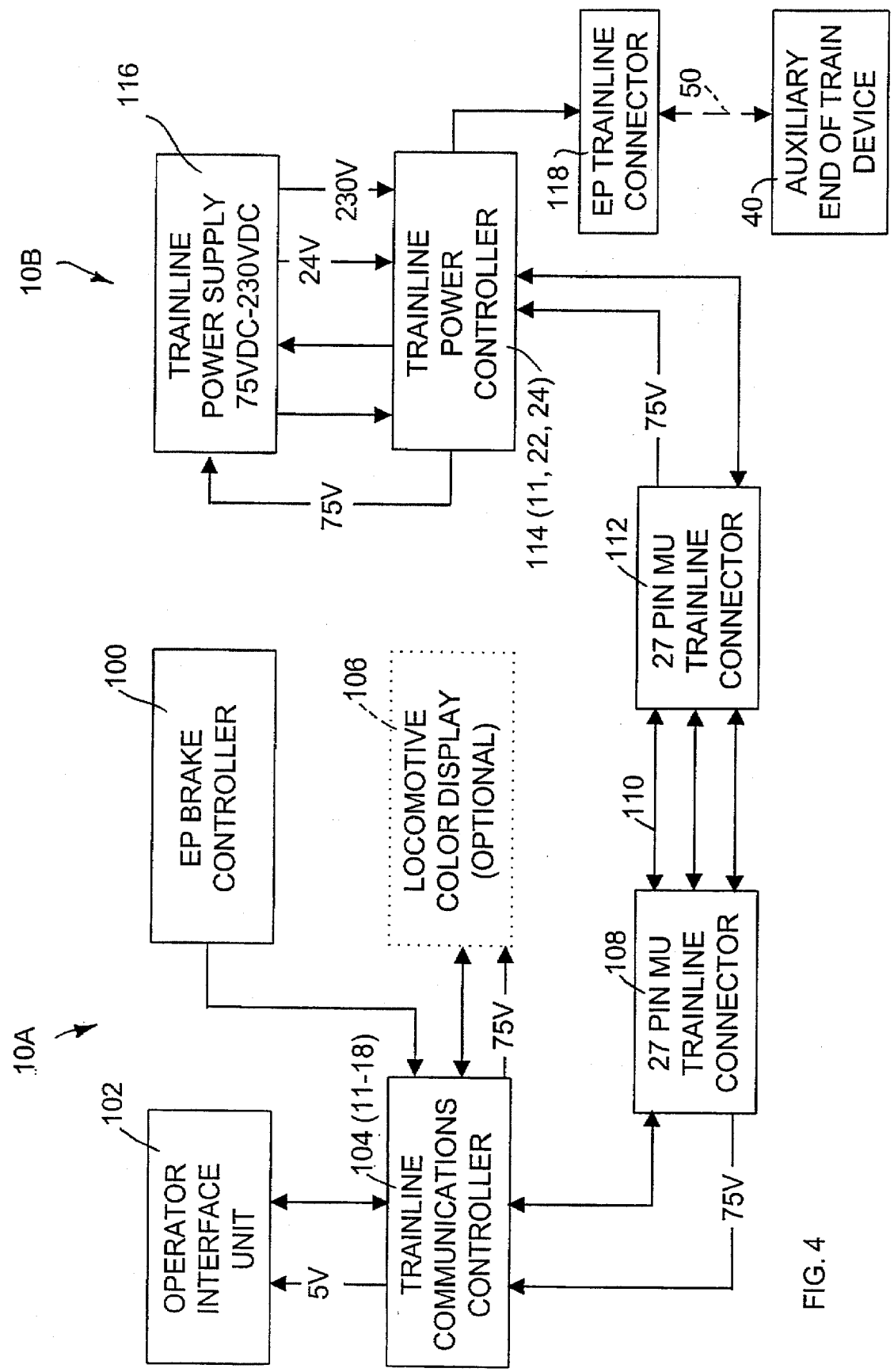
FIG. 4 is a block diagram of a multiple locomotive consist incorporating the principles of the present invention.

A train may include more than one locomotive as illustrated in FIG. 4. Two locomotives, for example, 10A and 10B are shown interconnected by a 27 pin multiple unit trainline 110, each having respective 27 pin connector 108 and 112. The lead locomotive 10A has an EP brake controller 100 and an operator interface unit 102 connected to the trainline communication controller 104. The trainline communication controller 104 would include elements 11–18 of FIG. 1. A locomotive color display 106 is optional. The trainline communication controller 104 is connected to the unoccupied leading end of the multi-pin connector 108 of the lead locomotive 10A. The trainline communication control 104 communicates over a pair of the 27 pin or line multiple unit locomotive trainline 110.

In the trailing locomotive 10B, a power line supply 116 is connected to trainline power controller 114. EP trainline connector 118 is connected to the trainline controller 114 which is connected to the unoccupied trailing end of the 27 pin multi-unit trainline connector 112. The trainline power controller 114 includes elements 11, 22 and 24 from FIG. 1. The trainline power controller 114 may be connected to the EP trainline connector 118 by one or more lines. Alternatively, the EP trainline connector may also be connected to the 27 pin multiple connector 112 for a signal transmission while the trainline power controller 114 provides the high powered voltage connection to the EP trainline connector 118.

The transmission of the test signal over trainline 50 between the auxiliary end of train device 40 and the trainline communication controller 104 is through the 27 pin multi-unit trainline 110. Once it is determined that the trainline 50 should be energized or powered, the trainline communication controller 104 communicates with the trainline power controller 114 to apply power to the trainline 50. By providing the high power voltage from the trailing locomotive, the 27 pin multi-unit trainline 110 is not energized with the voltage above the 75 volts, for example. This allows for communication through the total train from the lead locomotive and its trainline communication controller 104 while safely energizing the high power, high voltage from the trailing locomotive 10B to the cars in the train.

As previously discussed, the trainline 50 may include a pair of power lines with one or more signal transmission lines. The communication and polling to determine whether a car having an end of train device is connected in the consist, may be conducted over the power lines or over signal communication lines in the trainline. The importance being that the power lines are not activated with high voltage, high wattage power until an appropriate end of train device signal is received. This assures the safety of the personnel handling the train at interchange.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a train including at least one locomotive and a plurality of cars, each car being serially connected electrically to an adjacent car, by a trainline having at least a power line and having a local controller controlling an electric system powered at a first voltage from and controlled by a master controller in said locomotive, the method of powering each car comprising:

de-energizing said power line;

transmitting a test electrical signal between the locomotive and the last car in the trainline through each of the cars at a second voltage substantially less than said first voltage;

verifying receipt of the test electrical signal between the locomotive and the last car; and automatically powering said train over said power line at said first voltage upon verification.

2. The method according to claim 1, including delaying the powering of the train for a predetermined period after verification.

3. The method according to claim 1, including providing an end of train device in said last car of said train; and transmitting of the test electrical signal by said last car having said end of train device to the locomotive.

4. The method according to claim 1, wherein said last car's local controller reports receipt of trainline power to said master controller.

5. The method according to claim 4, wherein said test signal is transmitted and said last car's local controller reports over said power line, informing the master controller of trainline continuity.

6. The method according to claim 1, including providing an end of train device, a low voltage power source substantially less than said first voltage capable of powering said local controller and a transponder on said last car.

7. The method according to claim 1, wherein said test signal is transmitted over said power line.

8. The method according to claim 1, wherein said train includes a signal line extending therethrough and said test signal is transmitted over said signal line.

9. The method according to claim 1, wherein said test signal is transmitted from said last car to said locomotive through each car and said locomotive verifies receipt of the test electrical signal.

10. The method according to claim 1, wherein said test signal is transmitted from said locomotive to said last car through each car, said last car reports receipt of said test signal to said locomotive and said locomotive verifies receipt of the report.

11. A train including at least one locomotive and a plurality of cars, each car being serially connected electrically to an adjacent car by a trainline having at least a power line and having a local controller controlling an electrical system powered at a first voltage from and controlled by a master controller in said locomotive, wherein:

the local controller in a last car of the train has means for transmitting a test electrical signal to the locomotive on the trainline through each of the cars at a second voltage substantially less than said first voltage after deenergization of the power line;

said master controller has means for verifying a receipt of the test electrical signals from the last car of said train; and said master controller has means for automatically powering said power line at said first voltage upon a verification of the receipt of the test electrical signal.

12. The train according to claim 11, wherein the master controller has means for delaying the powering of the train for a predetermined period after the verification.

13. The train according to claim 11, including an end of train device in said last car of said train; and said verifying means verifies receipt of the test electrical signal by said last car's local controller having said end of train device.

14. The train according to claim 11, wherein said last car's local controller includes a transponder which reports receipt of trainline power to said master controller.

15. The train according to claim 14, wherein said test signal is transmitted and said last car's local controller reports over said power line.

16. The train according to claim 14, including on said last car, a low voltage power source substantially less than said first voltage capable of powering said local controller and transponder on said last car.

17. The train according to claim 11, wherein said test signal is transmitted and said last car's local controller reports over said power line.

18. The train according to claim 11, including on said last car, a low voltage power source substantially less than said first voltage capable of powering said local controller on said last car.

19. The train according to claim 11, wherein said train includes at least a leading and trailing locomotives; and said master controller is in said leading locomotive and said power line is powered from said trailing locomotive.

\* \* \* \* \*